Figure 1:
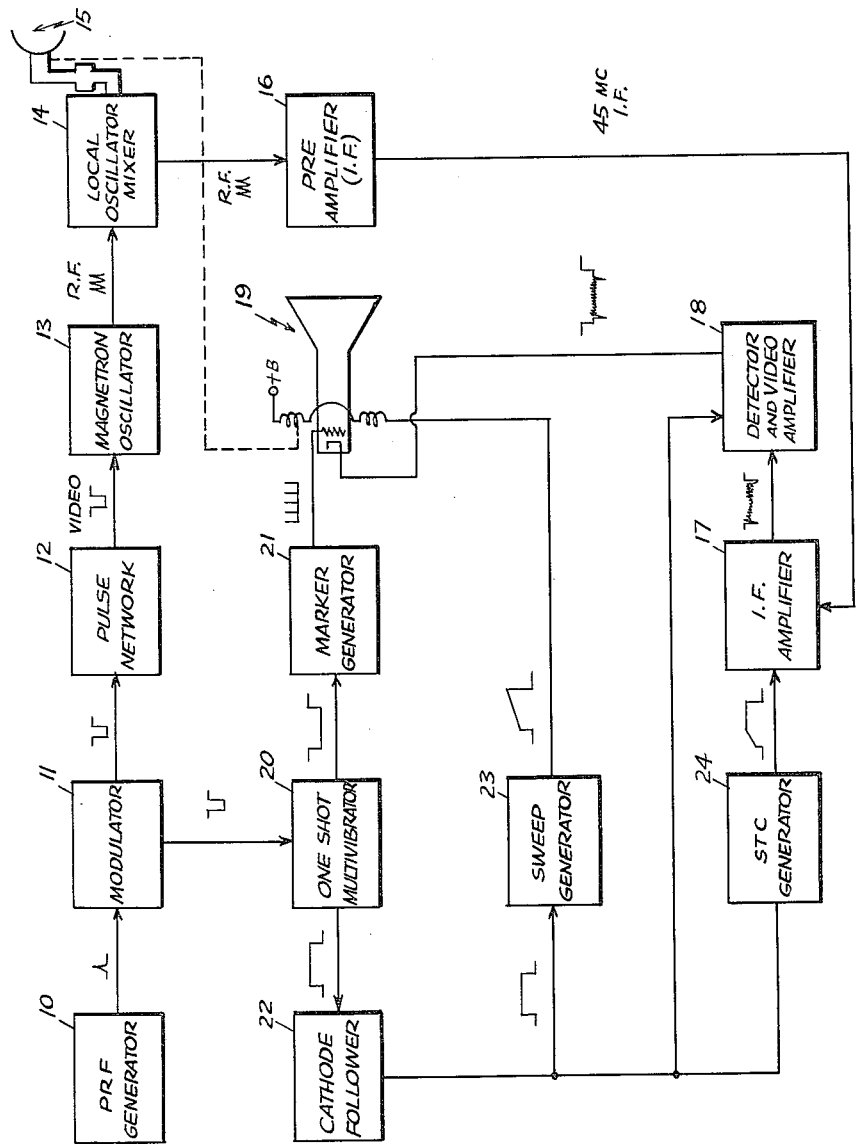

July 2, 1963   H. N. BEVERIDGE ET AL   3,096,517
PULSED ELECTRON DISCHARGE SYSTEMS
Original Filed Sept. 30, 1953   2 Sheets-Sheet 1

INVENTORS
HAROLD N. BEVERIDGE
HOWELL L. CARTER, JR.
BY Elmer J. Gorn
ATTORNEY

INVENTORS
HAROLD N. BEVERIDGE
HOWELL L. CARTER, JR.
BY
ATTORNEY

3,096,517
PULSED ELECTRON DISCHARGE SYSTEMS

Harold N. Beveridge, Santa Barbara, Calif., and Howell L. Carter, Jr., Natick, Mass., assignors to Raytheon Company, Lexington, Mass., a corporation of Delaware
Continuation of application Ser. No. 383,312, Sept. 30, 1953. This application Sept. 19, 1961, Ser. No. 143,269
8 Claims. (Cl. 343—17.1)

This invention relates to pulsed electron discharge systems and more particularly to systems for navigation or object location, such as pulse-echo radar systems. This is a continuation of application Serial No. 383,312, filed September 30, 1953, now abandoned, by the same inventors.

In pulse-echo radar systems, a high intensity pulse of energy is radiated from the transmitter for an extremely short period of time following which there is a relatively long period of time during which a receiver receives reflected echo signals which are presented on a suitable indicating device, such as a plan position indicator. The receiver normally remains energized at all times, but during the period when the transmitter is radiating, a protective device, such as a conventional duplexer tube, prevents too high a portion of the transmitted energy from being fed directly into the receiver thereby protecting the receiver from damage which might result due to overloading the crystal rectifiers. In addition, since the receiver contains frequency responsive elements these elements tend to ring due to pulse excitation of these elements by the transmitted pulse. In copending application, Serial No. 516,372, filed June 20, 1955 now abandoned, by Beveridge et al., there is disclosed a device for lowering the Q of these frequency responsive elements during the transmitted pulse, thereby reducing the ringing of these elements which normally would mask reception of close-in echoes.

This invention discloses that ringing of the frequency responsive elements of the receiver may be substantially reduced or prevented by maintaining the amplifying electron discharge devices of the receiver substantially non-conductive during the period of radiation by the transmitter. The receiver amplifier electron discharge devices are then turned on substantially at the termination of radiation of a pulse of energy from the transmitter, and, hence, receive little or no shock excitation from this source. For optimum results, the frequency responsive elements in the receiver, which are ahead of the first electron discharge device which is turned on or keyed following the transmitted pulse, are relatively low Q with the result that little or no ringing occurs in these elements. The elements following this discharge device have the desired Q to produce the desired bandpass characteristics, for example, as those required by an intermediate frequency amplifier.

In addition, this invention discloses that the desired range distance normally required in commercial radar applications for navigation purposes is considerably less than that theoretically possible for pulse repetition frequency, and, accordingly, the electron discharge devices of the receiver may be turned on for only that period of the cycle corresponding to the desired range distance and may remain off for the remainder of the cycle until immediately following the next transmitted pulse. This allows a saving in power with a resultant lessening of the size of the main power supply. In addition, since the electron discharge devices in the receiver remain off for a portion of the time, they may be run with larger currents and in fact, in excess, of their rated values during the period of time when they are on and, hence, a greater signal amplification may be achieved with a given number of stages than is possible if the devices remain conductive throughout the entire cycle.

Figure 2:
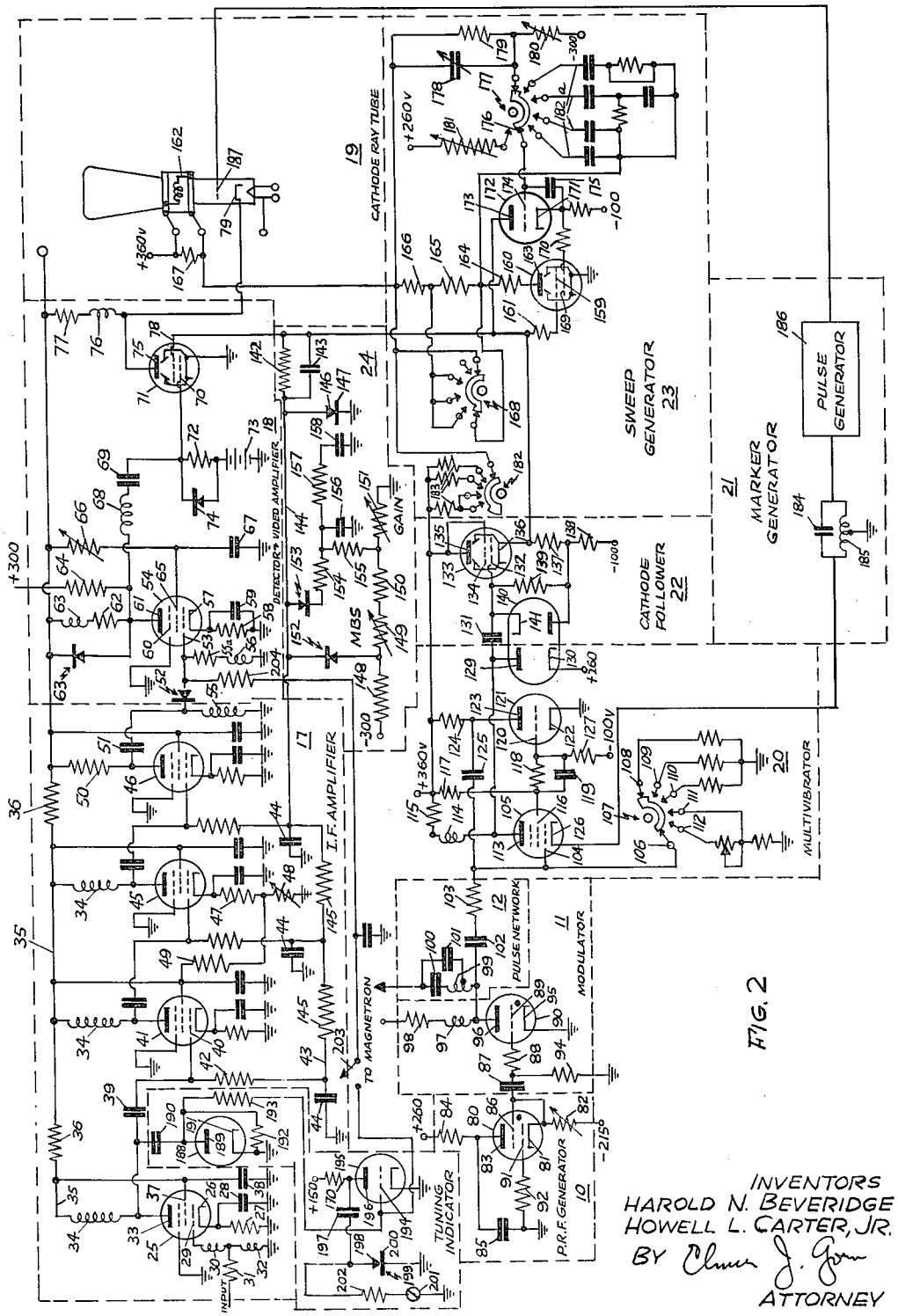

Other and further objects and advantages of this invention will become apparent, reference being had to the accompanying drawings, wherein:

FIG. 1 illustrates a functional flow diagram of a pulse-echo radar system utilizing this invention; and FIG. 2 illustrates the circuit details of a portion of the system illustrated in FIG. 1.

Referring now to FIG. 1, there is shown a pulse repetition frequency generator 10 whose output triggers a modulator 11, which, in combination with a pulse forming network 12, produces a short time duration, for example, one-fifth microsecond, pulse which is used to energize a magnetron oscillator 13. The output of the magnetron oscillator 13 is fed through suitable microwave plumbing to a local oscillator duplexer mixer section 14, which may be of any desired well-known type, and thence through suitable microwave plumbing to a directional antenna shown diagrammatically at 15 in accordance with well-known practice.

Received echo signals are picked up by antenna 15 and fed through the local oscillator duplexer mixer section 14 to a preamplifier section 16, which may comprise, for example, a broadly tuned amplifier or one utilizing low Q circuits, said amplifier remaining conductive throughout the cycle. The pre-amplifier 16 amplifies signals of the desired intermediate frequency, for example, as shown herein, at forty-five megacycles, which are produced by mixing local oscillator signals in section 14, differing in frequency from the transmitter frequency by forty-five megacycles, with the received echo signals in accordance with well-known practice. The output of pre-amplifier 16 is fed into an I.F. amplifier 17 whose output feeds a detector and video amplifier 18 which, in turn, feeds an intensity controlling electrode of a cathode ray tube 19, which may be used as a conventional plan position indicator.

The modulator 11 also feeds a one-shot multivibrator 20 which produces an output square wave having a time duration beginning substantially with the pulse output from the modulator 11 and continuing in time duration for many times the time duration of the modulator output pulse. The square wave output of multivibrator 20 is fed to a marker generator 21 which produces a series of sharp output pulses equally spaced in time during the period that the square wave is applied to marker generator 21, these pulses or pips in turn being applied to an intensity controlling electrode of the cathode ray tube 19 to produce range marker rings on a P.P.I. presentation in accordance with well-known practice. The multivibrator 20 also feeds a cathode follower 22 whose output is the same square wave as the input thereto.

The cathode follower 22 feeds a sweep generator 23 whose output is applied to deflection coils adapted to rotate about the neck of the cathode ray tube 19 in synchronism with rotation of the antenna 12, thereby producing the radial sweep on the cathode ray tube which rotates with the antenna creating the conventional plan position indicating pattern. The output of the cathode follower 22 is also fed to a sensitivity time control generator 24 which, in effect, varies the shape of the beginning portion of the square wave originally generated by multivibrator 20.

The output of the sensitivity time control generator 24 is fed to the I.F. amplifier 17 and is used to control operation of some of the electron discharge devices therein rendering them operative immediately following the transmitted pulse from magnetron oscillator 13 and rendering them inoperative after a sufficient period of time is elapsed to allow reception of echo signals from the desired range of distances. The gain of the discharge devices in I.F. amplifier 17 is also varied as a function of the shape of the leading section of the wave form applied thereto from the sensitivity time control generator 24 such that the gain of the I.F. amplifier is less for echoes received from close-in targets, thereby preventing masking of small close-in targets by background scattered reflection echoes. The output of cathode follower 22 is also used to control conduction of the electron discharge devices in the video amplifier 18 to allow conduction thereof only during the square wave output from the multivibrator 20.

In operation, a series of short pips are emitted from the generator 10 with a pulse repetition frequency which may be, for example, on the order of 1500 pulses per second, thereby causing 1500 one-fifth microsecond microwave pulses to be emitted from the magnetron oscillator 13 and radiated from the antenna 15. The duplexer in section 14, which may be, for example, a gaseous discharge device positioned in a resonant cavity, fires during each R.F. pulse output from the magnetron oscillator 13 thereby substantially preventing any large amount of transmitted energy from feeding through to the mixer section in accordance with well-known practice. A square wave output is produced by multivibrator 20 for each pulse output from the modulator 11, the time duration of the square wave output being any desired amount dependent on the maximum range from which it is desired that the equipment will receive echo signals. For example, if the maximum range is to be sixteen miles, the square wave should be on the order of 200 microseconds, during which the I.F. amplifier 17 and video amplifier 18 are conductive. Then follows a period of approximately 400 to 500 microseconds prior to the next modulator pulse during which the discharge devices in amplifiers 17 and 18 are nonconductive. During conduction of amplifiers 17 and 18, received echo signals are fed from the antenna 15 through to the cathode ray tube 19 and appear as bright spots positioned along radial sweep lines at distances from the center of the screen of cathode ray tube 19 corresponding to the ranges of the objects producing the echo signals and at sweep angles corresponding to the direction of reception, and, hence, the direction of the objects producing the echo signals with respect to the radar system.

Referring now to FIG. 2, there is shown the circuit details of the portion of the system shown in FIG. 1. The I.F. amplifier 17 comprises a plurality of amplifier stages. The first amplifier stage comprises a pentode 25 whose cathode 26 is connected to ground through a cathode bias resistor 27 bypassed by condenser 28. Grid 29 of tube 25 is connected through an inductance 30 and a resistance 31 to a low impedance signal input line coming from pre-amplifier 16. The junction between resistance 31 and inductance 30 is connected to ground through a choke 32. The inductance 30 is adjusted to resonate with the input capacitance of the tube 25 at the mid frequency of the pass-band of the I.F. amplifier which may be, for example, forty-five megacycles. Since the input capacitance of tube 25, the inductance 30, and the resistance 31, together with the input line, form the elements of a series resonant circuit, adjustment of the value of resistance 31 varies the Q of this circuit. For optimum results resistance 31 is adjusted to produce a low Q circuit which does not produce any substantial ringing when excited by the transmitted pulse. The value of resistance 31 may be, for example, on the order of one-hundred thirty ohms.

The plate 33 of tube 25 is connected through a plate load inductance 34 to a high potential bus 35, for example of 150 volts, which contains spaced therealong, resistors 36 for decoupling purposes. The screen grid 37 of tube 25 is connected to the high voltage bus 35 and to ground through a bypass condenser 38. The plate 33 is also connected through a coupling condenser 39 to the grid 40 of tube 41 making up the second stage of the I.F. amplifier. The grid 40 is also connected through a grid load resistor 42 to a grid bias bus 43 which is bypassed to ground by an R.F. bypass condenser 44 for decoupling purposes. Stage 41, in turn, feeds a third stage 45, which, in turn, feeds a stage 46. As shown here, stage 41 is in all respects, other than those previously described, similar to stage 25. Stage 45 is similar to stage 41, except that the cathode load resistor comprises two parts, a fixed portion 47 connected from the cathode of stage 45 to a variable resistance portion 48, which, in turn, is connected to ground. The junction between resistors 47 and 48 is connected through a bleeder resistance 49 to the bus 35 such that adjustment of the resistance portion 48 adjusts the bias on stage 41, and, hence, the gain of this stage. This is the main gain control of the radar receiver. The plate inductance of stages 41 and 45 may be adjusted to resonate with the output capacitances of the stages at the desired intermediate frequency or, for example, forty-five megacycles. These resonant circuits may be relatively high Q and if desired, succeeding stages may be stagger tuned to increase the bandwidth. The suppressor grids of stages 25, 41, 45 and 46 are connected to ground. The stage 46 fed by stage 45 is similar to the stage 41, except that a resistance 50 has been substituted for the plate load inductance 34. Stage 46 acts as the output stage of the I.F. amplifier strip, and, if desired, more I.F. amplifier stages may be inserted before the output stage 46.

The output signal from stage 46 is coupled through a coupling condenser 51 connected from the plate of stage 46 to one side of a crystal rectifier 52, the other side of which is connected to the grid 53 of a video amplifier pentode tube stage 54. An inductance 55 is connected from the junction, between the crystal diode 52 and the condenser 51, to ground. The grid 53 of the video amplifier 54 is also returned to ground through a grid load resistance 55a and inductance 56 in series. The inductance 56 is adjusted for shunt peaking with the input capacity of the video amplifier 54, the output capacity of the stage 46, and any stray capacity, at the upper end of the video frequency band, for example, ten megacycles. The crystal diode 52 rectifies the output signal from the I.F. amplifier and acts as an amplitude detector with the informational content contained in the modulated I.F. signals appearing as negative excursion video signals on the grid of the video amplifier tube 54.

The video amplifier 54 is cathode biased by connecting the cathode 57 of tube 54 through ground to a cathode bias resistor 58 bypassed by condenser 59. The suppressor grid 60 of tube 54 is grounded. The anode 61 of tube 54 is connected to the high voltage bus 35 through a load resistor 62 and an inductance 63 in series. Anode 61 is also connected to bus 35 through a crystal rectifier 63, rectifier 63 being so poled that the electron current will flow only from bus 35 to the anode 61 through crystal rectifier 63. As illustrated herein, the crystal rectifiers use the convention that the flat plate represents the electron emitting element equivalent to the cathode in a conventional vacuum diode and the triangular element represents the electron receiving electrode equivalent to the anode in a conventional vacuum diode. Anode 61 of tube 54 is also connected through a voltage dropping resistor 64 to a source of positive voltage approximately double that on bus 35, for example 300 volts. The screen grid 65 of tube 61 is connected to the bus 35 through a variable resistance 66 and to ground through a signal bypass condenser 67. The video amplifier stage 54 also acts as an amplitude limiter by reason of the fact that the video signals appearing at the grid 53 are negative voltage excursions from the normal operating bias on grid 53, that is, negative with respect to ground potential. The values of resistors 62 and 64 are adjusted such that the anode 61 arrives at the voltage of the bus 35 as the grid 53 is driven into the non-linear region of the grid control characteristic of the tube 54. Any additional negative excursion of the grid 53 causes conduction of the crystal rectifier 63 and prevents the anode 61 from going any further positive, thus sharply limiting any output signals of the video amplifier stage 54 having amplitudes above those necessary to cause conduction of the diode 63. Adjustment of the screen dropping resistor 66 adjusts the quiescent operating conditions of the tube 54, and, hence, adjusts the amplitude of the output signal at which limiting occurs by the diode 63.

Anode 61 is also connected through an inductance 68 and coupling condenser 69 in series to the grid 70 of a second video amplifier stage 71. Grid 70 is connected through a grid load resistor 72 to a fixed negative grid bias shown here, by way of example, as a battery 73. A crystal diode 74 is connected across resistor 72 and acts as a clamper which prevents grid 70 from being driven more negative than potential applied thereto by battery 73. The inductance 68 and condenser 69 form elements of a low-pass filter, together with the input and output impedances of the stages 54 and 71 which passes video frequencies, for example below twenty megacycles, but rejects frequencies above twenty megacycles and in particular, the R.F. component of the I.F. frequency of, for example, forthy to fifty megacycles.

The cathode of tube 71, which may be, for example, a beam power amplifier, is connected to ground with the desired operating bias for the tube being provided by the grid bias battery 73. The anode 75 of tube 71 is connected through a video peaking inductance 76 and load resistor 77 in series to voltage bus 35. The screen grid 78 of tube 71 is fed from the cathode follower circuit 22 of FIG. 1 which applies square wave pulses thereto to periodically render the tube 71 conductive. The output from tube 71 is fed to the cathode ray tube 19 by connecting the plate 75 of tube 71 to the cathode 79 of cathode ray tube 19.

The pulse repetition rate of the system is controlled by the pulse repetition frequency generator 10 comprising a thyratron 80 whose cathode 81 is connected to a source of negative potential of, for example 215 volts, through a variable resistance 82. The anode 83 of thyratron 80 is connected to a source of positive potential of, for example 260 volts, through resistance 84 and is connected to ground through a bypass condenser 85, the purpose of resistance 84 and condenser 85 being to decouple the thyratron 80 from the positive voltage source. The values of resistance 84 and condenser 85 are adjusted such that their time constant is many times less than time duration of a cycle of the pulse repetition frequency. The screen grid 86 of the thyratron, which may be, for example, a type 2D21 tube, is connected to the cathode 81 and through a condenser 87 and a current-limiting resistanec 88 in series to grid 89 of a grid-controlled gaseous discharge tube 90 in the modulator section 11. The grid 91 of thyratron 80 is connected to ground through a grid current-limiting resistance 92.

In operation, firing of the thyratron 80 rapidly discharges the condenser 87 producing a sharp pulse output to grid 89 of tube 90. The cathode 81 of tube 80 rises rapidly toward the potential of anode 83 until the thyratron 80 becomes extinguished. The cathode 81 then moves slowly negative as the condenser 87 charges through the resistance 82 until it reaches a point sufficiently negative to cause the thyratron 80 to refire. The repetition rate at which the thyratron 80 fires is determined by the charging rate of the condenser 87 which is, in turn, determined by the value of resistance 82 which is adjustable, thereby allowing adjustment of the pulse repetition frequency. The junction between the resistor 88 and the condenser 87 is connected to ground through a grid load resistance 94. The cathode 95 of tube 90 is connected to ground. The anode 96 of tube 90 is connected to a source of a very high potential, for example 3000 volts, through a charging inductance 97 and charging resistance 98 in series.

The anode 96 of tube 90 is also connected through one section of a pulse-forming network comprising an inductance 99 and condenser 100 in series to a modulation cable which feeds the magnetron in accordance with conventional practice. The inductance 99 has a tap thereon from which a connection is made through a condenser 101 to the side of condenser 100 which is not connected to the inductance 97. The values of the elements 99, 100, and 101 are selected such that when the thyratron 90 fires, upon being energized by the pulse repetition frequency generator 10, a high amplitude D.C. pulse of approximately one-fifth micro-second duration is fed to the magnetron oscillator 13 of FIG. 1. The modulator pulse is also fed to the one-shot multivibrator 20 by connecting the anode 96 of tube 90 through a condenser 102 and isolating resistor 103 in series to the grid 104 of a pentode 105 which comprises one tube of the one-shot multivibrator 20.

Grid 104 of pentode 105 is connected to the tap 106 of a range switch section 107, which, as shown here by way of example, allows the operator to switch to searching on five different ranges. These may be, for example, the one-mile, two-mile, four-mile, eight-mile and sixteen-mile ranges which is accomplished by contacting the tap 106 to contacts 108, 109, 110, 111 and 112, respectively. Taps 108 through 112 are connected through resistors of various values to ground. The anode 13 of tube 105 is connected through a plate load inductance 114 and plate current-limiting resistance 115 to a source of positive potential of, for example +360 volts. The screen grid 116 of tube 105 is connected through grid load resistance 117 to the same B+ as plate 113. Screen grid 116 is also connected through voltage-dropping resistance 118 bypassed by a condenser 119 to the grid 120 of a triode 121 making up the other section of the multivibrator. Cathode 122 of tube 121 is grounded and the anode 123 of tube 121 is connected through a load resistance 124 to the same source of potential as anode 113. Anode 123 is also connected through a condenser 125 to the grid 104 of tube 105. Cathode 126 of tube 105 is connected through a resonant circuit in the marker generator circuit, to be described presently, and thence to ground. The grid 120 of tube 121 is also connected to a source of negative potential of, for example, approximately one hundred volts, through a voltage dropping resistance 127.

In operation, the multivibrator 20 receives a portion of the pulse from the modulator, said portion being applied to grid 104 of tube 105 as a negative-going pulse which drives tube 105 into cut-off. This causes screen grid 116 to move positive, thereby coupling a positve pulse through condenser 119 to the grid 120 of tube 121, which is normally cut off by reason of suitable values in the voltage divider comprising resistor 127, resistor 118 and resistor 117, thereby causing tube 121 to conduct, and, hence, driving the plate 123 thereof negative. The negative excursion of plate 123 is coupled through condenser 125 back to grid 104 of tube 105 insuring that ube 105 becomes completely cut off. Condenser 125 then discharges slowly through one of the resistors connected to the grid 104 by the switch 107, the time required for the discharge being determined by the size of the resistor. When the condenser 125 has discharged sufficiently to allow the grid 104 to move up out of cut-off, the tube 105 begins to conduct, thereby driving the screen grid 116 negative which, in turn, drives the grid 120 of tube 121 negative cutting off tube 120 and causing tube 105 to return to its normal heavily conducting position. The result is a positive-going square wave, appearing at the anode 113 of tube 105, which is synchronized to begin with the modulation pulse and whose time duration is adjusted for the various range distances at which it is desired the equipment shall operate. Anode 113 is connected to the plate 129 of a vacuum diode whose cathode 130 is connected to a source of positive potential, for example of 260 volts, such that the positive-going wave form appearing at anode 113 has a sharp square top not exceeding a potential of 260 volts, since if anode 113 attempts to rise above this point, current flows from the cathode 130 to the anode 129 of the diode, thereby limiting positive excursion of anode 113 of tube 105. The square wave output appearing at anode 113 is coupled through a coupling condenser 131 to the grid 132 of a beam power tube 133, which is used in the cathode follower circuit 22 of FIG. 1. The screen grid 134 and anode 135 of tube 133 are both connected to the same positive potential source as the anodes of the multivibrator tube. The cathode 136 of tube 133 is connected through cathode load resistors 137 and 138 in series to a suitable negative voltage supply, for example on the order of one hundred volts. The grid 132 is connected through a grid load resistor 139 to the junction between resistors 137 and 138. A D.C. restorer comprising diode 140 is connected across resistor 139 with the cathode 141 of the diode being connected to the grid 132 of tube 133.

The cathode 136 of the cathode follower tube 133 is connected directly to the screen grid 78 of the second video amplifier stage 71 to apply the desired keying pulse to this stage. The square wave output from the cathode 136 of the cathode follower tube 133 is also fed to the sensitivity time control generator 24 by connecting cathode 136 through a voltage-dropping resistor 142 bypassed by a condenser 143 to a sensitivity time control bus 144, which is connected, respectively, to the grids of tubes 41, 45 and 46 through their respective grid load resistors. The bus 144 has resistors 145 positioned therein between the points of connection of the bus to the grid load resistors of adjacent stages 41, 45 and 46, respectively. Points of connection of the bus 144 to the grid load resistors are bypassed by R.F. bypass condensers 44, which, together with resistors 145, provide decoupling between the stages of this circuit at the I.F. frequency. Bus 144 is connected to the anode element 146 of a crystal diode whose cathode element 147 is grounded. This prevents bus 144 from exceeding ground potential in a positive direction.

The sensitivity time control generator comprises a voltage divided network utilizing a fixed resistor 148, a variable resistor 149, a fixed resistor 150 and a variable resistor 151, all connected, respectively, in series, from a source of negative potential of, for example —300 volts to ground. The values of resistors 148 and 150 are selected such that the junction between resistors 148 and 149 is sufficient to cut off stages 41, 45 and 46, for example on the order of —10 volts, with the resistors 149 and 151 set in their minimum position. The junction between resistors 148 and 149 is connected to the anode element of a crystal 152 whose cathode element is connected to bus 144. Bus 144 is also connected to the anode element of a crystal diode 153 whose cathode element is connected through resistors 154 and 155 to the junction between resistors 150 and 151. The junction between 154 and 155 is connected to ground through a charging condenser 156 and to ground through charging resistor 157 and charging condenser 158 in series. In the absence of a pulse, current flows from the potential source comprising junction between resistors 148 and 149 through crystal diode 152, thereby maintaining the bus 144 at the potential of this junction. During this period the condensers 156 and 158 charge negatively with respect to ground through resistors 155 and 157 to the potential of the junction between resistors 150 and 151.

When a square wave output appears at the output of the cathode follower section 22, it attempts to drive the bus 144 positive. However, since the resistor 142 is of a relatively high value, for example fifteen kilohms, the voltages previously applied to the components 149 through 158 will determine the shape of the wave form appearing on bus 144. Specifically, the bus will move in a positive direction until crystal diode 153 conducts, which will occur when bus 144 reaches the potential of the junction between resistors 150 and 151. At this point, condensers 156 and 158 will begin to discharge through resistors 157, 154 and 142 at a rate determined by the values thereof, thereby causing bus 144 to move positive at a rate determined by the values of the condensers 156 and 158 and the resistors 142, 154 and 157. This process continues until the bus 144 reaches ground potential whereupon current flows through the crystal elements 146 and 147, thereby maintaining the bus 144 at ground potential throughout the remainder of positive square wave pulse. The potential at which crystal 153 conducts can be adjusted primarily by adjustment of the resistor 151 and represents the sensitivity time control setting for the I.F. amplifier. The shape of the wave appearing on the bus 144 is, therefore, a square wave whose leading edge is modified to have a slope determined by the charging of condensers 156 and 158, the extent of the slope being determined by setting of resistor 151. This sloping portion reduces the gain of the system immediately following the transmitted pulse, thereby reducing the reception of background clutter noise immediately following the outgoing pulse which would mask close-in targets.

The adjustment of the resistor 149 adjusts the potential appearing on bus 144 in the absence of the square wave output from the cathode follower. Since the square wave output is not present until after the transmitted pulse has ended, adjustment of resistor 149 controls the bias appearing on the grids of the I.F. amplifier stages when the transmitted pulse occurs. This voltage may be adjusted to a point where the peaks of the transmitted pulse cause conduction to occur in the non-conducting I.F. amplifier tubes, thereby feeding through to the plan position indicator cathode ray tube 19 a small signal indicative of the outgoing pulse. The resistor 149 is normally adjusted such that this mark clearly appears, but substantially no ringing effect following the transmitted pulse occurs.

The cathode 136 of cathode follower stage 22 is also connected to the screen grid 159 to a beam power amplifier tube 160, which is part of the sweep generator circuit 23 of FIG. 1, through a current-limiting resistance 161. The cathode of tube 160 is connected to ground and the anode 163 thereof is connected to a source of positive potential of, for example +360 volts, through resistors 164, 165, 166 and 167, all connected in series. A deflection coil 162 for the cathode ray tube, which is the same cathode ray tube deflection coil as is shown in FIG. 1, is connected across resistor 167, which acts as a damping resistor to absorb the energy during kick back of the sweep. Resistors 165 and 166 are shorted out by means of a switch section 168, ganged to sweep section 107, on the one-mile range. The resistor 166 is shorted out on the two-mile, four-mile and eight-mile ranges while both resistors remain effective in the circuit on the sixteen-mile range. The grid 169 of tube 160 is connected through a current-limiting resistance 170 to the cathode 171 of a cathode follower triode 172 whose anode 173 is fed from the cathode 136 of the cathode follower stage 22.

The grid 174 of tube 172 is connected to the cathode 171 through a condenser 175 and to the tap 176 of a multi-position switch 177 ganged to switches 168 and 107. With the switch 177 set to the one-mile range, as shown in the drawing, the grid 174 is connected through switch 177 and a variable condenser 178 to the junction between resistors 166 and 167. Positioned across condenser 178 is a resistor 179 and connected to the junction between switch tap 177 and condenser 178 is one end of a variable resistance 180, the other end of which is connected to a source of negative potential of, for example —300 volts. With the switch 177 set for the one-mile range, which is the position indicated in the drawing, the operation of the sweep generator is as follows: Prior to application of the square wave from the cathode follower tube 133 to the sweep circuit, the anode 163 of tube 160 is at the +360 volt potential, since no current is flowing through the resistor string 164 through 167. Neither tubes 160 nor 172 are conducting, since the anode 173 of tube 172 and the screen grid 161 of tube 160 are at the potential of the cathode 136 of the cathode follower tube 133, which, in the absence of the square wave, is somewhat below ground potential. The grid 174 of tube 172, being connected to the junction between resistors 179 and 180, is positioned close to ground potential due to current being drawn from grid 174 during this period through resistor 179. When the square wave pulse is applied to the screen grid 159 of tube 160 and the plate 173 of the tube 172, tubes 160 and 172 conduct, producing a substantially square wave drop across the resistance string 167 and the sweep coil 162 in parallel. A portion of this voltage is fed back through resistor 179 and the switch 177 to the grid 174 of cathode follower 172 and, hence, through resistance 170 to the grid 169 of sweep tube 160. This causes the current output from tube 160 to stabilize such that the voltage appearing across sweep coil 162 has a substantial square wave form, hence producing a substantially linearly increasing current through coil 162 and thereby producing a substantially linear sweep. Linearity of the sweep is further improved by means of condenser 178, which, in effect, causes a greater amount of negative feed-back to occur at the beginning of the sweep than during the later stages thereof. This, in effect, causes the output voltage wave form appearing across the deflection coil to be a square wave whose top slopes upwardly sufficiently to compensate for the I.R. drop through the coil 162. Condenser 178 is made adjustable to adjust the slope of the top of the square wave applied to the deflection coils and, hence, to adjust the linearity of the sweep.

On the two-mile, four-mile, eight-mile and sixteen-mile range sweeps, the grid 174 is connected through a variable resistor 181 to a positive potential of, for example, +260 volts, and through one of a group of condensers 182a dependent on the setting of range switch 177 to the junction between resistors 164 and 165. On these ranges, sweep generator performs as a Miller run-down system wherein the condenser 182 gradually charges through resistor 181 gradually raising the potential of grid 174, hence, driving grid 169 more positive and attempting to increase the current through tube 160. However, since increasing the current through tube 160 lowers the potential of the junction between resistors 164 and 165, hence lowering the potential coupled through the condenser 182 to the grid 174, the whole system remains relatively stable, producing a saw-tooth output current to the deflection coil 162. A switch section 182 is provided having the tap thereof connected to the junction between resistors 166 and 167 and a plurality of contacts contacted on the various range distances, which are connected through various resistors 183 to the +360 supply to which resistor 167 is connected, hence resistors 183 are switched across resistor 167 for various range distances by actuation to switch 182, which is ganged to switches 107, 168 and 177, thereby varying the damping applied across the sweep coil 162 for the different ranges.

The marker generator circuit 21 of FIG. 1 is shown here diagrammatically as a box containing a parallel resonant circuit consisting of a condenser 184 positioned across a coil 185. The coil 185 is center tapped to ground and one end of the coil is connected to the cathode 126 of the multivibrator pentode 105. The other end of the coil feeds the grid of pulse generator stage 186, the output of which is connected to the control grid 187 of the cathode ray tube 19. The condenser 184 and coil 185 are tuned to resonate to produce pulse outputs from the pulse generator 186 at desired range markers, for example, at one-half-mile or two-mile ranges. These pulses appear as bright pips on the scope and are used to establish the range of objects producing echoes on the plan position indicator. It is to be clearly understood that any of the well-known marker generator circuits could be used for this purpose.

A tuning indicator is provided comprising a diode 188 whose anode 189 is fed through an R.F. coupling condenser 190 from the anode 33 of the first I.F. stage 25. The cathode 191 of diode 188 is grounded. The anode 189 is also connected to ground through an output load resistance 192 and through a filtering resistor 193 to the grid 194 of a tuning meter amplifier tube 195. The cathode of tube 195 is grounded and the anode 196 thereof is connected to a positive source of, for example one-hundred-fifty volts, through a plate load resistor 170. Anode 196 is coupled through an audio frequency coupling condenser 197 to the anode element 198 of a crystal rectifier 199 whose cathode element 200 is grounded, and also to a meter 201 through a resistor 202 acting as a volt meter. This portion of the tuning meter acts primarily on the portion of the transmitted pulse which gets through the duplexing system. The diode 188 rectifies the R.F. portion of the pulse, with the inherent capacity thereof, together with the resistors 193 and 192, filtering out the R.F. component of the detected pulse. The detected envelope is amplified by the tube 195 and then again rectified by the crystal 199, which, in effect, detects the A.C. component of the transmitted pulse envelope. This component is made of irregularities along the top of the output pulse, the presence of which indicates clearly that the transmitted pulse is being received by the receiver section. The local oscillator in the duplexer assembly 14 of FIG. 1 is tuned manually until the meter 201 reads a maximum, thus indicating centering of the received portion of the transmitted pulse in the I.F. band after mixing with the local oscillator.

In order to tune up the microwave plumbing of the system, a switch 203 is provided which connects the grid 194 of tuning amplifier tube 195 through impedance isolating resistance 204 to the grid 53 of the first video amplifier stage 54 immediately following detection by the amplitude detector crystal 52. Switch 203 is normally open during operation of the equipment and the local oscillator is periodically adjusted to peak the meter 201. However, when it is desired to adjust the resonant frequency of the duplexer cavity, the switch 203 is closed and the meter 201 is adjusted to peak by adjusting the tuning of the duplexer tube cavity. This is possible since adjustment of the duplexer tube cavity has little effect on the component of the transmitted pulse rectified by rectifiers 188 and 198, but does affect the received echo signal. In addition, since the receiver stages feeding the amplitude detector 52 are off during the transmitted pulse, little or none of the transmitted pulse is fed through the tuning meter from the detector 52. On the other hand, since the transmitter is not firing during the period when the signals are being received at the detector 52, these signals will be a function of true echo signals.

This completes the description of the particular embodiments of the invention illustrated herein. However, many modifications thereof will be apparent to persons skilled in the art without departing from the spirit and scope of this invention. For example, the I.F. amplifier stages could be keyed by applying the keying potentials to the screen grids, suppressor grids, or anodes rather than the control grids, the video amplifier could be keyed by applying the keying pulse to the control grid, suppressor grid or anode, a greater or lesser number of the I.F. amplifier or video amplifier stages could be keyed, and other well-known forms of sweep generators, pulse repetition rate generators, marker generators and tuning systems could be used. In addition, the system is not limited to use with the conventional plan position indicator display, but may be used with any of the other well-known indicator displays. Accordingly, it is desired that this invention be not limited by the particular details of

What is claimed is:

1. In combination, means for repetitively radiating pulse wave energy, receiving means for receiving reflected signals of said pulse wave energy, said receiving means comprising a first amplifying stage connected to and feeding a second amplifying stage, said second amplifying stage having a substantially higher Q than said first amplifying stage, means for rendering said second amplifying stage periodically amplifying and non-amplifying, said amplifying periods being substantially longer than the pulse duration of said radiated pulse wave energy and substantially less than the repetition interval of said pulse wave energy.

2. An electron discharge system comprising means for repetitively radiating pulse wave energy, receiving means comprising an electron discharge device for amplifying received signals of said pulse wave energy, the input to which discharge device has a substantially lower Q than the output of said device, and means for cyclically rendering said discharge device periodically amplifying and non-amplifying, said amplifying period being substantially longer than the pulse duration of said radiated signals of pulse wave energy and substantially less than the repetition interval of said pulse wave energy.

3. An electron discharge system comprising signal radiating means, means for cyclically energizing said radiating means to radiate a signal of pulse wave energy, an electron discharge device for receiving energy derived from said energy radiation, the input to which electron discharge device has a substantially lower Q than the output of said device, means for cyclically rendering said device periodically amplifying and non-amplifying, said period of time being substantially longer than the pulse duration of said received pulse wave energy and substantially shorter than the time interval between successive radiated signals, and means for synchronizing the repetition rate of the energizing means with the repetition rate of said means for causing amplification and non-amplification by said discharge device.

4. An electron discharge system comprising signal radiating means, means for cyclically pulse energizing said radiating means to radiate signals of pulse wave energy, a plurality of electron discharge devices for receiving and amplifying said energy radiation, the first of which devices is normally amplifying and the remainder of which devices are alternately amplifying and non-amplifying in time, which first discharge device has a substantially lower Q than said alternately amplifying and non-amplifying discharge devices, and means for periodically causing amplification and non-amplification by said amplifying and non-amplifying devices, to produce amplification over a period of time that is substantially longer than the pulse duration of said received pulse wave energy and substantially shorter than the time interval between successive radiated signals.

5. In an echo ranging system comprising means for radiating signals, means for cyclically pulse energizing said radiating means to radiate signals of pulse wave energy, a wave energy receiving device comprising a plurality of electron discharge devices for amplifying received signal wave energy, the first of which devices is normally amplifying, and the remainder of which devices are alternately amplifying and non-amplifying in time, which first device has a substantially lower Q than said alternately amplifying and non-amplifying devices, means for cyclically producing amplification by said alternately amplifying electron discharge devices to produce amplification of received signal wave energy over a period of time that is substantially longer than the pulse duration of said radiated pulse wave energy and also substantially shorter than the time interval between the emission of successive radiated signals.

6. In combination, means for radiating signals, means for cyclically pulse energizing said radiating means to radiate a signal of pulse wave energy, a wave energy receiving means comprising intermediate frequency amplification means comprising a normally amplifying means and at least one time alternating amplifying and non-amplifying means, in that order of signal amplification, which normally amplifying means has a substantially lower Q than said alternately amplifying and non-amplifying means, means for controlling the amplification by said latter means according to a sensitivity-time control function, means for varying the leading edge of said function, demodulation means connected to and fed by said intermediate frequency amplification means, video amplification means connected to and fed by said demodulation means, comprising amplifying means, means for biasing said alternately amplifying and non-amplifying intermediate frequency and video amplifying means to amplify signals over a period of time substantially longer than the pulse duration of said radiated pulse wave energy and also substantially shorter than the time interval between successive radiated signals.

7. In an echo ranging system comprising means for radiating signals, means for cyclically pulse energizing said radiating means to radiate a signal of pulse wave energy, a wave energy receiving device comprising an intermediate frequency amplifier comprising a grid controlled normally amplifying electron discharge device, and at least one alternately amplifying and non-amplifying in time electron discharge device in that order of signal amplification, which normally amplifying electron discharge device is also connected to and feeding a tuning indicator, which normally amplifying electron discharge device has a substantially lower Q than said alternately amplifying and non-amplifying electron discharge device, means for biasing the grid of said alternately amplifying electron discharge device according to a sensitivity-time control function, means for varying the leading edge of said function, a demodulator connected to and fed by the output of said intermediate frequency amplifier, a video amplifier connected to and fed by said demodulator, comprising at least one grid controlled electron discharge device, which electron discharge device has a screen grid, means for cyclically biasing the grid of said alternately amplifying intermediate frequency electron discharge devices, and said screen grid of said video amplifier electron discharge device, to amplify signals for a period of time substantially longer than the pulse duration of said radiated pulse wave energy and also substantially shorter than the interval between successive radiated signals.

8. In combination, means for radiating signals, means for cyclically pulse energizing said radiating means to radiate a signal of pulse wave energy, a wave energy receiving means comprising intermediate frequency amplification means comprising a normally amplifying means and at least one alternately amplifying and non-amplifying in time means, in that order of signal amplification, which normally amplifying means is also connected to and feeding means for indicating the tuning of said receiving means, which normally amplifying means has a substantially lower Q than said alternately amplifying and non-amplifying means, means for controlling the amplification by said latter means according to a sensitivity-time control function, demodulation means connected to and fed by said intermediate frequency amplification means, video amplification means connected to and fed by said demodulation means, comprising amplifying means, means for biasing said alternately amplifying and non-amplifying intermediate frequency and video amplifying means to amplify signals for a period of time substantially longer than the pulse duration of said radiated pulse wave energy and substantially shorter than the time interval between successive radiated signals.

No references cited.